(12) United States Patent
Altaf et al.

(10) Patent No.: US 7,475,286 B2
(45) Date of Patent: Jan. 6, 2009

(54) SYSTEM AND METHOD FOR UPDATING END USER ERROR REPORTS USING PROGRAMMER DEFECT LOGS

(75) Inventors: Naeem Altaf, Round Rock, TX (US); David Bruce Kumhyr, Austin, TX (US); Heath Christopher Newburn, Round Rock, TX (US); James Daniel Wiggins, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/032,185

(22) Filed: Jan. 10, 2005

(65) Prior Publication Data

US 2006/0156077 A1 Jul. 13, 2006

(51) Int. Cl.
*G06F 11/00* (2006.01)
(52) U.S. Cl. ...................................................... 714/27
(58) Field of Classification Search .................. 714/46, 714/57
See application file for complete search history.

(56) References Cited

U.S. PATENT DOCUMENTS

| | | | | |
|---|---|---|---|---|
| 5,047,977 A | * | 9/1991 | Hill et al. ...................... | 714/57 |
| 5,121,475 A | * | 6/1992 | Child et al. .................. | 715/507 |
| 5,778,184 A | | 7/1998 | Brownmiller et al. .. | 395/200.54 |
| 5,790,779 A | * | 8/1998 | Ben-Natan et al. ............ | 714/39 |
| 5,799,148 A | * | 8/1998 | Cuddihy et al. ............... | 714/26 |
| 5,950,209 A | | 9/1999 | Carrier, III et al. .......... | 707/203 |
| 6,012,152 A | * | 1/2000 | Douik et al. ................... | 714/26 |
| 6,145,096 A | * | 11/2000 | Bereiter et al. ................ | 714/25 |
| 6,301,613 B1 | | 10/2001 | Ahlstrom et al. ............. | 709/223 |
| 6,360,255 B1 | | 3/2002 | McCormack et al. ....... | 709/221 |
| 6,415,979 B1 | | 7/2002 | Allard ................... | 235/462.13 |
| 6,473,659 B1 | * | 10/2002 | Shah et al. ..................... | 700/79 |
| 6,526,529 B1 | * | 2/2003 | Miksovsky et al. ........... | 714/57 |
| 6,556,659 B1 | | 4/2003 | Bowman-Amuah ........ | 379/9.04 |
| 6,742,141 B1 | * | 5/2004 | Miller .......................... | 714/26 |
| 6,961,878 B2 | * | 11/2005 | Kirkpatrick et al. ........... | 714/57 |
| 6,999,990 B1 | * | 2/2006 | Sullivan et al. ............. | 709/205 |
| 7,165,194 B2 | * | 1/2007 | Paradkar ...................... | 714/57 |

(Continued)

OTHER PUBLICATIONS

Berling et al., "Evaluation of a Perspective Based Review Method Applied in an Industrial Setting", IEE Proc.-Softw., vol. 150, No. 3, Jun. 2003, pp. 177-184.

*Primary Examiner*—Bryce P Bonzo
(74) *Attorney, Agent, or Firm*—Duke W. Yee; Justin M. Dillon; Wayne P. Bailey (57) ABSTRACT

A system and method for correlating end user error reports with software developer defect logs to thereby update the end user error reports with information from the developer defect logs. With the system and method, when support personnel open an end user error report to address the problem encountered by the user, the mechanisms of the system and method search a defect report database to determine if there is any defect report related to the same error that is the subject of the opened end user error report. If so, the end user error report is updated to include information from the defect report. This information may include, for example, the identity of the source of the problem generating the error, the identity of the fix or patch that solves the problem generating the error encountered by the end user, if any, and the like.

20 Claims, 8 Drawing Sheets

U.S. PATENT DOCUMENTS

| | | | |
|---|---|---|---|
| 7,293,201 B2 * | 11/2007 | Ansari | 714/38 |
| 2002/0162056 A1 * | 10/2002 | Forman et al. | 714/46 |
| 2004/0153791 A1 * | 8/2004 | Arend | 714/26 |
| 2008/0065577 A1 * | 3/2008 | Chefalas et al. | 706/47 |

* cited by examiner

```
APAR= IY40414  SER=                          PR PR
SENTRY_ENGINE LEAVING DEFUNCT PROCESSES

STAT= CLOSED   PER FESN0907938-   CTID- RM0821 ISEV= 2
SB03/02/10   RC03/02/18   CL03/03/31  PD          SEV= 2
                          PE=                     TYPE= F
RCOMP= 5698EMN00  TIV DIST MON V3 RREL= R370
FCOMP= 5698EMN00  TIV DIST MON V3 PFREL= F999  TREL= T
ACTION=                SEC/INT= N               DUP/
USPTF=                 PDPTF=                   DUPS 0
DW03/02/10   RT03/02/18  SC         FT          RE
PT           UP          LP         PV03/03/31  AP
EN           FL          LC03/03/31 RU03/03/31  OT03/02/19
CT03/02/19   FR          TD         TYPE OF SOLUTION=
PROJECTED CLOSE CODE=         CUST INST LVL/SU= 370
FAILING MODULE: ENGINE        FAILING LVL/SU=   370
SYSROUTE OF:           RET APAR=           PS= S
STATUS DETAIL= DESIGN/CODE    RELIEF AVAILABLE=
SCP: UNIX    PLATFORM: UNIX
HIPER SYMPTOMS:
DATALOSS/N      SYSTEMOUTAGE/N     FUNCTIONLOSS/N
PERFORMANCE/N   PERVASIVE/N
XSYSTEM/N

SPEC/ATTN/N

SYSRES=     SYSIN=       SYSOUT=       CPU=        RE-IPL=
OPTYPE=                  SPECIAL ACTIVITY=         REGRESSION=
PRE-SCREEN NO.=          RSCP= RS370
ERROR DESCRIPTION:
sentry_engine on MN sometimes fails to perform a wait action on
child processes during an exec_it call. This causes the child
processes to become defunct processes
.
Sentry_Engine is leaving defunct processes on the Managed Node.
Customer setup the following test to recreate ...

On all Endpoints a Heartbeat is implemented as follows:
A DM string script monitor executes "hostname" every 2 minutes
on the
Endpoint and runs as response level "always" the program
"heartbeat.sh"
on the TMR-Server. This script looks as follows:
.
#!/bin/ksh
LOCATION="/tmp/ep1"
touch ½ LOCATION/½ ENDPOINT
echo "½ {PREV_VALUE}" > ½ LOCATION/½ ENDPOINT Level 3 have reviewed the PMR and confirm a defect exists.
LOCAL FIX:
.
```

*FIG. 7A*

PROBLEM SUMMARY:
SENTRY_ENGINE LEAVING DEFUNCT PROCESSES
PROBLEM CONCLUSION:
The problem has been fixed in patch 3.7-DMN-0048E officially supported.
TEMPORARY FIX:
COMMENTS:
MODULES/MACROS:    ENGINE
SRLS:         NONE
RTN CODES:

*FIG. 7B*

APPLICABLE COMPONENT LEVEL/SU:
R370 PSY          UP
CIRCUMVENTION:
MESSAGE TO SUBMITTER:

CUST NAME= JENKINS, ANDREW                 CUST NO= 0155030
    STREET=                                PROB NO= 62641,010
      CITY=                                LICENSE=
       ZIP=
                       IBM CONFIDENTIAL
CUST REP= PETER WENZL              PHONE= +43-664-6186013
BO NAME= IBM AUSTRIA     (VIENNA)       AREA  =AR# 86
         OBERE DONAUSTRASSE 95         B.O.  NO=B 010
         VIENNA 1020                   COUNTRY=C 618
AUSTRIA                              AST CT=     IP CT= 1

JENKINS, ANDREW           / 62641  Y  B 010   AR# 86   C 618

TRACKING:
CREATED    CR03/02/10  CRRM0821  INCIDENT TRANSFER        1643
EDIT       SB03/02/10  SB884615  INTERESTED PARTY PAGE 2  1644
RECEIPT    RT03/02/18  RTRM0821                           1414
RECEIVED   RC03/02/18  RCRM0821                           1414
S2UPDATE   ED03/02/19  ED784619  CT03/02/19             S2 0116
S2UPDATE   ED03/02/19  ED784619  SD/ASSIGNMENT          S2 0116
S2UPDATE   ED03/02/19  ED784619  SD/ANALYSIS            S2 0333
S2UPDATE   ED03/02/19  ED784619  SD/CREATE              S2 0340
S2UPDATE   ED03/02/19  ED784619  SD/DESIGN/CODE         S2 0346
CLOSED     CL03/03/31  CLRM0821  PER                       0854

CID info :
   CREATED BY: JENKINS, ANDREW          (LCTU) ON 02/10/03 AT LOC 251

| | | | |
|---|---|---|---|
| prefix | c | | |
| name | 50139 | | |
| reference | | | |
| abstract | DEV: Hyperformix Windows NetworkIntCard | | |
| duplicate | | | |

*FIG. 8A*

| | |
|---|---|
| state | closed |
| severity | 3 |
| age | 13 |

| | | | |
|---|---|---|---|
| compName | tmnt_RMs | answer | comply_with |
| release | tmnt_5.1.1_FP06 | | |
| envName | Windows | | |
| level | | | |

| | | | |
|---|---|---|---|
| addDate | 2004/04/28 22:26:00 | assignDate | 2004/04/28 22:49:56 |
| lastUpdate | 2004/06/23 14:35:54 | responseDate | 2004/04/28 22:45:22 |
| endDate | 2004/06/23 14:35:54 | | |

| | | | |
|---|---|---|---|
| ownerLogin | mannaru | originLogin | llassite |
| ownerName | MANNARU, DURGA D. | originName | LASSITER, LINWOOD |
| ownerArea | 8A0952897 | originArea | 086986897 |

| | | | |
|---|---|---|---|
| remoteName | | remoteFamily | |
| symptom | function_needed | | |
| phaseFound | BVT | | | phaseInject
priority
target
relnote
dochit
aparname
aparstatus
endabstract
apar_reviewer
apar_certify
enh_req
patch_req
ExtPatchId
hasApar
CausedByReleas
Category
activity
odctrigger
impact
odctarget
deftype
qualifier
content
source
srchistory
tracks:

| releaseName | state | addDate | lastUpdate | target |
|---|---|---|---|---|
| tmnt_5.1.1 | complete | 2004/04/28 | 2004/05/06 | |
| tmnt_5.1.1_FP06 | complete | 2004/04/28 | 2004/05/28 | |
| tmnt_5.1.2_FP02 | complete | 2004/05/24 | 2004/06/23 | | verify:

| type | state | addDate | lastUpdate | userLogin | duplicate |
|---|---|---|---|---|---|
| original | accept | 2004/04/28 | 2004/06/17 | llassite | 50139 |

*FIG. 8B* history:

| addDate | action | userLogin | (userName) |
|---|---|---|---|
| 2004/04/28 22:26:00 | open | llassite | (LASSITER, LINWOOD) |
| 2004/04/28 22:45:08 | assign | llassite | (LASSITER, LINWOOD) |
| 2004/04/28 22:45:22 | accept | llassite | (LASSITER, LINWOOD) |
| 2004/04/28 22:49:56 | assign | llassite | (LASSITER, LINWOOD) |
| 2004/05/06 16:50:53 | note | llassite | (LASSITER, LINWOOD) |
| 2004/05/28 15:49:46 | testnote | hnewburn | (NEWBURN, HEATH) |
| 2004/05/28 15:49:46 | verify | hnewburn | (NEWBURN, HEATH) |
| 2004/06/23 14:35:54 | testnote | ucaselli | (CASELLI, UMBERTO) |
| 2004/06/23 14:35:54 | close | ucaselli | (CASELLI, UMBERTO) | notes:
<Note by llassite (LASSITER, LINWOOD), 2004/04/28 22:26:00, seq: 1 rel: 0 action: open>
Add logging of in/out bytes to the Windows TMW_NetworkIntCard <Note by llassite (LASSITER, LINWOOD), 2004/04/28 22:45:08, seq: 2 rel: 0 action: assign>
Old owner: barlock
New Owner: llassite <Note by llassite (LASSITER, LINWOOD), 2004/04/28 22:45:22, seq: 3 rel: 0 action: accept>
Hyperformix changes will be implemented <Note by llassite (LASSITER, LINWOOD), 2004/04/28 22:49:56, seq: 4 rel: 0 action: assign>
Old Owner: llassite
New Owner: mannaru <Note by llassite (LASSITER, LINWOOD), 2004/05/06 16:50:52, seq: 5 rel: 0 action: note>
review of the TMW_Resources10.mof file TMW_NetworkInterface_10 for addition of
BytesReceivedSec/BytesSentSec
complete.

Review of TMW_NetworkIntCard.dmws for the addition of ReceivedBytesSec/TransmittedBytesSec
to logging context Network Traffic_Network Interface Card complete.

These modifications were required for the additional logging metrics added
to the RMs and TEDW.

<Note by hnewburn (NEWBURN, HEATH), 2004/05/28 15:49:46, seq: 6 rel: 0 action: testnote>
Test accept for environment standard of release tmnt_5.1.1_FP06.
This is not a Verification acceptance, it is to move the track
from the test state. Please verify as normal.

<Note by ucaselli (CASELLI, UMBERTO), 2004/06/23 14:35:54, seq: 7 rel: 0 action: testnote>
Test accept for environment tmnt_5.1.2_FP01 of release tmnt_5.1.2_FP02.

FIG. 9

SYSTEM AND METHOD FOR UPDATING END USER ERROR REPORTS USING PROGRAMMER DEFECT LOGS

BACKGROUND OF THE INVENTION

1. Technical Field

The present invention is generally directed to an improved data processing system. More specifically, the present invention is directed to a system and method for updating end user error reports using programmer defect logs.

2. Description of Related Art

Typically, when an end user of a software product experiences a problem with the operation of the software, the end user submits an error report to the software developer so that the software developer may determined and address the source of the error. These error reports, also referred to as Authorized Program Analysis Reports (APARs) include information about the error and the person submitting the error report to the software distributor.

Support personnel associated with the software developer may access, or "open," the error report in order to determine what error was experienced by the user and then attempt to ascertain the source of the problem that cause the error. Meanwhile, the source of the particular problem and error may have been fixed by a software developer during development of fixes or patches to the software product. That is, the support personnel may receive a report of an error that has already been fixed by the software developers but the support personnel may not be aware of this fix or patch. Thus, the support personnel may investigate an error and spend resources trying to determine the source of the error and a possible solution to the problem when the source of the error has already been fixed by an update, e.g., fix or patch, to the software product.

Thus, it would be beneficial to have a system and method for updating end user error reports such that information about fixes or patches that provide a solution to the error may be integrated into the end user error report for review by support personnel.

SUMMARY OF THE INVENTION

The present invention provides a mechanism for correlating end user error reports with software developer defect logs to thereby update the end user error reports with information from the developer defect logs. With the present invention, end user error reports are submitted to a developer system from one or more end users of a software product. These end user error reports are stored in an end user error report database.

Similarly, programmers or developers of software products generate defect reports identifying defects of a software product that are encountered during development or updating of a software product. These defect reports are stored in a defect report database. The defect reports may identify the source of the defect, the solution to the defect, the identity of a fix or patch that provides a solution to the defect, and the like.

With the present invention, when support personnel open the end user error report to address the problem encountered by the user, the mechanisms of the present invention search the defect report database to determine if there is any defect report related to the same error that is the subject of the opened end user error report. If so, the end user error report is updated to include information from the defect report. This information may include, for example, the identity of the source of the problem generating the error, the identity of the fix or patch that solves the problem generating the error encountered by the end user, if any, and the like. Thereafter, the updated end user error report is presented to the support personnel so that the support personnel are informed of the particular source, fix or patch for the encountered problem.

In one exemplary embodiment of the present invention the correlation between the end user error reports and the defect reports is made possible by parsing each of these reports and generating templates having similar fields which may be compared. Thus, for example, a first template may be provided for storing parsed information from the end user error report and a second template may be provided for storing parsed information from the defect report. The first and second templates, populated by the information parsed from the reports, may then be compared to determine if there is a match. If a match is identified, then information from the matching defect report may be appended or otherwise used to augment the end user error report.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A and 7B illustrate an example of an APAR which may be used with the present invention;

FIGS. 8A and 8B illustrate an example of a programmer defect log entry which may be used with the present invention.

DETAILED DESCRIPTION OF THE PREFERRED EMBODIMENT

The present invention is directed to a system and method for updating end user error reports using defect reports from a defect database or log. The present invention is especially well suited for implementation in a distributed data processing environment in which end users make use of software products provided either by their client computing devices or by server computing devices. The end users may report errors encountered during use of these software products to a software development system or server in the distributed data processing environment. Moreover, support personnel may make use of their own workstations to access these end users error reports in order to determine how to handle the errors reported by the user. In a preferred embodiment of the present invention, determining how to handle the errors includes correlating the end user error reports with defect reports generated by software developers or programmers which are stored in a defect report database.

Figure 1:
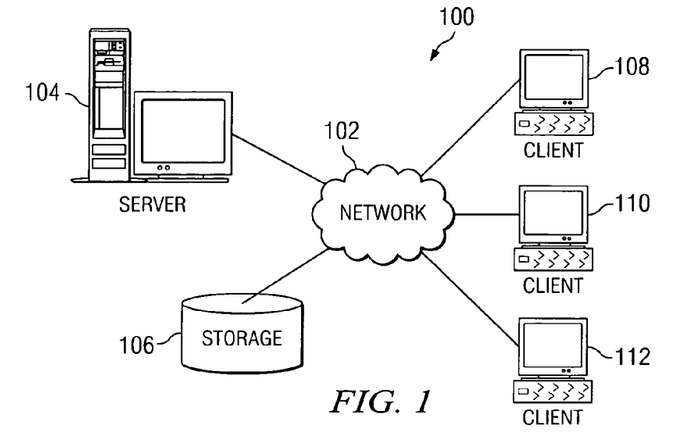
FIG. 1 is an exemplary block diagram of a distributed data processing system in which aspects of the present invention may be implemented.
Figure 2:
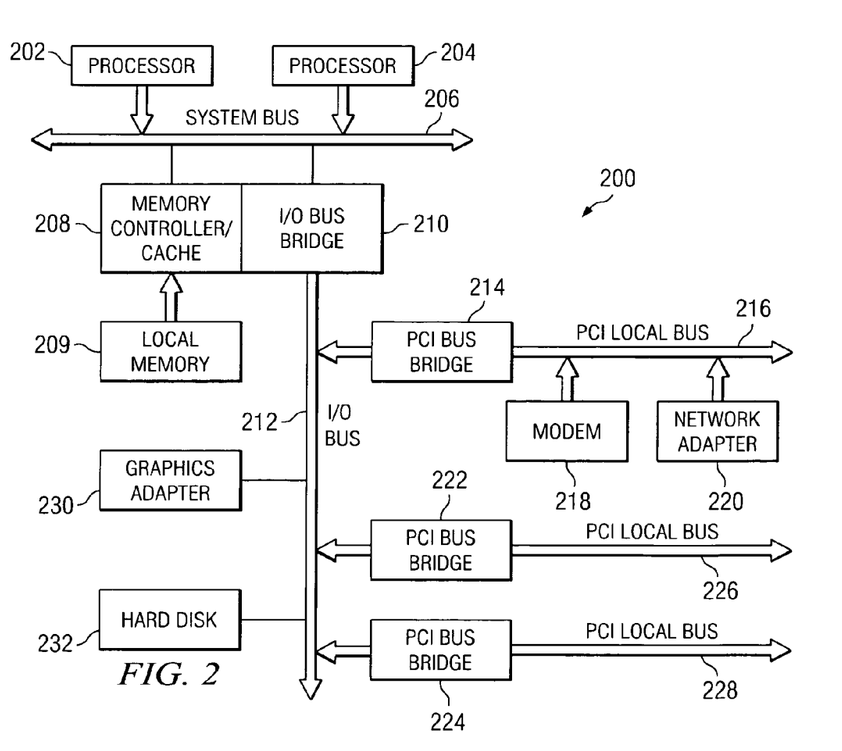
FIG. 2 is an exemplary block diagram of a server computing device in which aspects of the present invention may be implemented.
Figure 3:
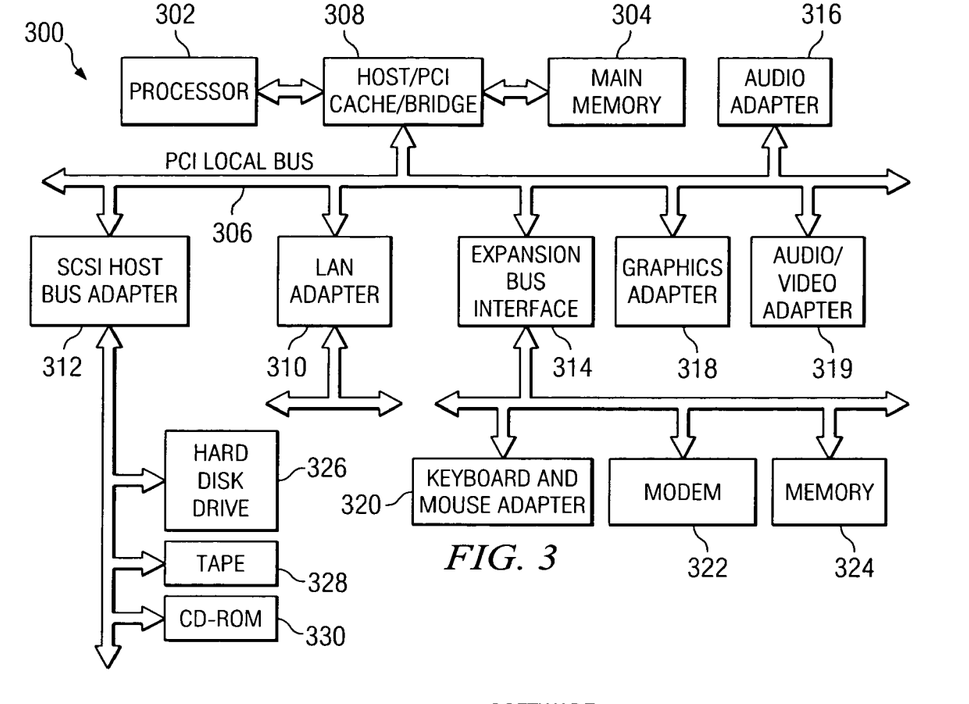
FIG. 3 is an exemplary block diagram of a client computing device in which aspects of the present invention may be implemented.

Since the present invention is preferably implemented in a distributed data processing environment, the following FIGS. 1-3 are provided as an example of the distributed data processing environment and the computing devices on which aspects of the present invention may be implemented. The following figures are intended to only be exemplary and are not intended to state or imply any limitation with regard to the types of data processing environments or computing devices in which the aspects of the present invention may be implemented. Many modifications to the configurations of the data processing environment and computing devices depicted in FIGS. 1-3 may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation.

An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides a mechanism for correlating end user error reports with software developer defect logs to thereby update the end user error reports with information from the developer defect logs. Defect reports are generated by software programmers or developers during the process of generating a software product or updating a software product. These defect reports are records that identify problems encountered with the operation of the software product. The defect reports may include many different types of information including, for example, the date the defect report was generated, the last update date of the defect report, the name of the original person to generate the defect report, a description of the defect, a history of the actions performed regarding the defect, the identity of the fixes or patches that were developed that solve the problem leading to the defect, and the like. As software programmers work on the software product and attempt to solve the identified defects, these defect reports are generated and updated to reflect their actions and the results of these actions. The defect reports are stored in a defect report database so that they may be accessed by software programmers to identify the defects that have been identified in the software product.

Similarly, when a software product that has been distributed to end users encounters a problem that meets certain predetermined criteria, e.g., a fatal exception, unrecoverable error, etc., the end user of the client computing device is provided with a user interface through which the end user may enter information regarding the error and submit the information, along with automatically accumulated information from the client computing device, or server computing device if the software product is executing on a server, being used by the end user, to a software provider's computing system. End user error reports are submitted to a developer system from one or more end users of a software product. These end user error reports are stored in an end user error report database.

When an end user error report is submitted to the developer system, support personnel may be assigned to investigate the end user error report in order to determine how to handle the reported problem. The support person assigned to the end user error report may "open" the end user error report, i.e. access the end user error report record in the end user error report database, and review the information describing the error that was encountered. The support person may then consult his own sources of information to identify how to handle the reported error. For example, the support person may perform an on-line search of a support document that describes errors and their corresponding solutions. The support person may further consult a manual or other type of documentation that may have been generated for use by support personnel in processing end user error reports.

A problem arises, however, in that end users may report errors to the developer system that have already been addressed by software programmers but this information has not been provided to the support personnel. As a result, the support personnel must expend many man-hours and resources in attempting to determine how to handle the end user's reported error. If it were possible to provide information from the software developers' defect reports to the support personnel, then many of these man-hours and resources may be saved in situations where the error encountered by the end user has been solved by the software programmers. A primary object of the present invention is to provide a mechanism for correlating and integrating information from defect reports into end user error reports for use by support personnel in handling reported end user errors.

With the present invention, when support personnel open the end user error report to address the problem encountered by the user, the mechanisms of the present invention search the defect report database to determine if there is any defect report related to the same error that is the subject of the opened end user error report. If so, the end user error report is updated to include information from the defect report. This information may include, for example, the identity of the source of the problem generating the error, the identity of the fix or patch that solves the problem generating the error encountered by the end user, if any, and the like. Thereafter, the updated end user error report is presented to the support personnel so that the support personnel are informed of the particular source, fix or patch for the encountered problem.

In one exemplary embodiment of the present invention the correlation between the end user error reports and the defect reports is made possible by parsing each of these reports and generating templates having similar fields which may be compared. Thus, for example, a first template may be provided for storing parsed information from the end user error report and a second template may be provided for storing parsed information from the defect report.

These first and second templates have formats that identify which tags in end user error reports and in programmer defect reports, respectively, that match fields in the templates. These formats may be used to extract information from the end user error reports and programmer defect reports, based on identified tags, so that the extracted information may be used to populate fields in the templates. The first and second templates, populated by the information parsed from the reports, may then be compared to determine if there is a match. If a match is identified, then information from the matching defect report may be appended or otherwise used to augment the end user error report.

Figure 4:
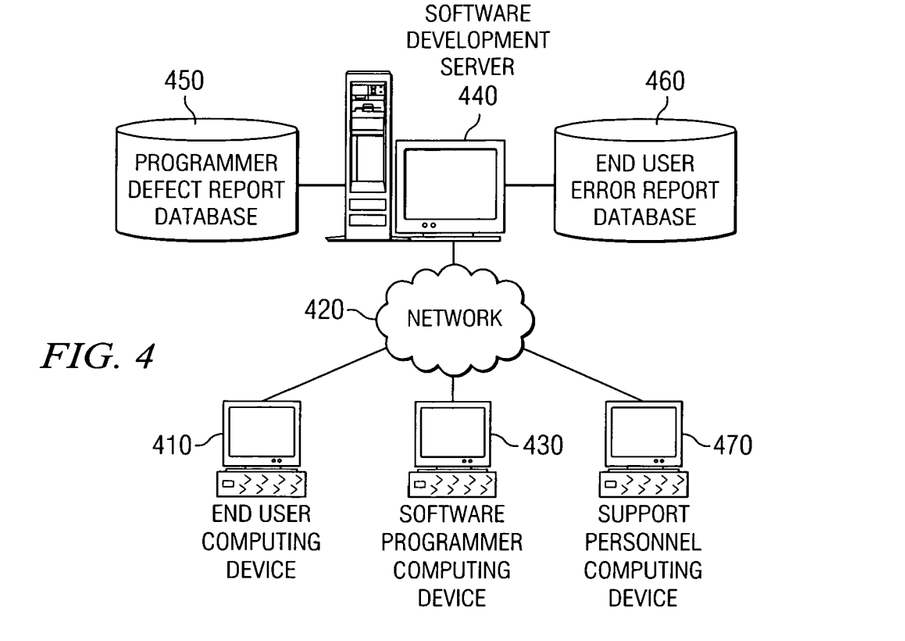
FIG. 4 is an exemplary diagram illustrating the primary operational components of system for correlating end user error reports with programmer defect reports in accordance with one exemplary embodiment of the present invention.

FIG. 4 is an exemplary diagram illustrating the primary operational components of system for correlating end user error reports with programmer defect reports in accordance with one exemplary embodiment of the present invention. As shown in FIG. 4, a software development server 440 is coupled to a programmer defect report database 450 and a end user error report database 460. While these databases 450 and 460 are shown as being coupled directly to the software developer server 440, the present invention does not require this. Rather, the databases 450-460 may be accessed via the network 420 rather than having to be directly coupled to the software development server 440.

In addition to software development server 440, a software programmer computing device 430 and an end user computing device 410 are coupled to the network 420. The network 420 may be any type of network of data processing devices including a local area network (LAN), wide area network (WAN), the Internet, or the like. Network 420 may further include a plurality of networks of the same or different types coupled together using router and server computing devices, as is generally known in the art.

The software development server 440 permits users of software programmer computing devices, such as software programmer computing device 430, to create, access and update programmer defect report database records as the development of a software product progresses and various defects are identified, worked on, and their fixes are completed. In addition, the software development server 440 permits the receipt of end user error reports from end user computing devices, such as end user computing device 410, for software products distributed by the software developer. The end user error reports received from end user computing device 410 are stored in end user error report database 460. The defect reports generated, accessed and modified by the software programmers are stored in the programmer defect report database 450.

Support personnel using the support personnel computing device 470 may access the end user error report database 460 to open, modify, and close end user error reports stored therein via the software development server 440. The support personnel make user of the support personnel computing device 470 to determine what actions are necessary to resolve the errors reported by end user computing devices 410 with regard to software products distributed by the software developer. As previously noted above, in known systems, the support personnel do not have access to the programmer defect reports generated by the software programmer computing devices and thus, the support personnel may not have the latest information regarding fixes or patches of the software product that address the sources of errors that may be reported by end users.

With the present invention, the end user error reports generated by the end users include information associated with identifiable tags. These tags may designate the various types of information associated with the tags. For example, a tag may be associated with a name of a user submitting the error report, a type of error, a software module generating the error, an error code, etc. Similarly, the programmer defect reports have similar tags designating various types of information stored in the programmer defect report. The tags in both the end user error report and the programmer defect report are then used later to process the end user error report to identify any matching programmer defect reports.

When a user of a support personnel computing device 470 accesses an end user error report in the end user error report database 460, the software development server 440 retrieves the end user error report data from the end user error report database 460 and processes it to form an end user error report template. This processing may involve, for example, parsing the end user error report to identify tags within the end user error report and populating corresponding fields of an end user error report template with the information corresponding to the identified tags. The correspondence between the tags and the fields in the template may be provided via a template format associated with the template. In this way, the important information for identifying corresponding programmer defect reports may be extracted from the end user error report and placed in an end user error report template.

Similarly, the software development server 440 retrieves programmer defect reports from the programmer defect report database 450 and processes them to extract information for comparing to the end user error report template. This processing may include parsing the defect reports to identify tags in the defect reports and populate defect report templates with the information corresponding to the identified tags. The correspondence between tags in the defect reports and fields in the templates may be provided via a template format associated with the templates.

The programmer defect reports that are processed in this manner may include all of the programmer defect reports associated with a particular software product for which the end user error report was generated, a subset of the programmer defect reports corresponding to a particular module or error type associated with the end user error report (if the programmer defect report database is categorized in this manner), or the like. Typically, a plurality of programmer defect reports will be processed to generate a plurality of programmer defect report templates which are then compared against the end user error report template.

Once the templates are generated by populating general templates for the end user error report and the programmer defect reports with specific information extracted from the reports, the software development server compares the generated templates to identify any matches. That is, the contents of the fields in the end user error report template and the programmer defect report templates that correspond to each other, e.g., have a same or similar tag, are compared. If the contents match, a degree of matching value for the programmer defect report template is increased by a particular amount based on a predetermined weighting associated with each field. This process is performed for each field of the templates with a total degree of matching for a programmer defect report being the sum of the weights of the matching fields.

If this total degree of matching is above a predetermined threshold, then the templates are considered to match and the programmer defect report is considered to be directed to the same problem source as the end user error report. As a result, the software development server 440 takes information from the matching programmer defect report and integrates the information into the end user error report. This information that is integrated preferably includes the identity of any fixes, patches, or descriptions of solutions to the problem.

Once the end user error report is modified to include information from the matching programmer defect report, the modified end user error report is stored in the end user error report database 460 and also provided to the support personnel computing device 470. In this way, the support personnel investigating an end user error report are informed of the programmer fixes, patches, or solutions to the problem that is the source of the end user error report. Thus, the support personnel are provided with the most accurate and current information regarding the possible solutions to the problem that is the source of the error described in the end user error report and may take appropriate actions to process the end user error report in light of this current information.

Figure 5:
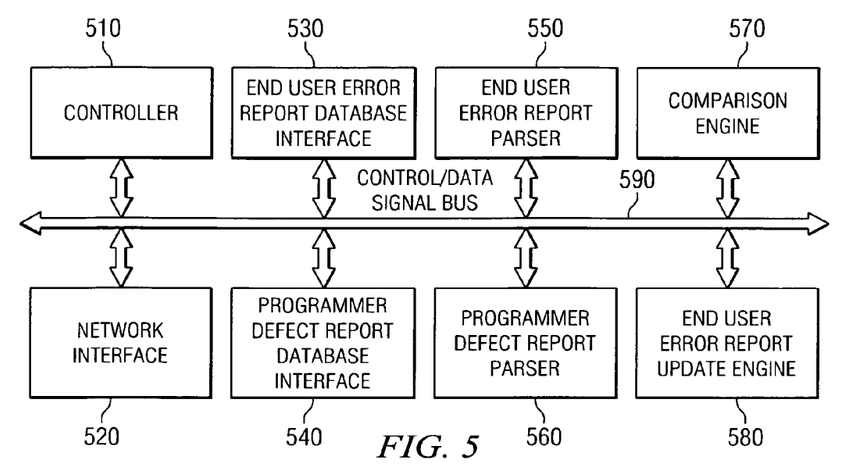
FIG. 5 is an exemplary block diagram of the primary operational components of an error/defect report correlation engine in accordance with one exemplary embodiment of the present invention.

FIG. 5 is an exemplary block diagram of the primary operational components of an error/defect report correlation engine in accordance with one exemplary embodiment of the present invention. The error/defect report correlation engine of FIG. 5 may be integrated into the software development server 440 or may be a separate device coupled to the software development server 440, for example. The elements shown in FIG. 5 may be implemented in hardware, software, or any combination of hardware and software. In a preferred embodiment, the elements shown in FIG. 5 are implemented as software instructions executed by one or more processors.

As shown in FIG. 5, the error/defect report correlation engine includes a controller 510, a network interface 520, an end user error report database interface 530, a programmer defect report database interface 540, an end user error report parser 550, a programmer defect report parser 560, a comparison engine 570, and an end user error report update engine 580. The elements 510-580 are in communication with one another via the control/data signal bus 590. Although a bus architecture is shown in FIG. 5, it should be appreciated that the present invention is not limited to such and any architecture that facilitates the communication of control/data signals between the elements 510-580 may be used without departing from the spirit and scope of the present invention.

The controller 510 controls the overall operation of the error/defect report correlation engine and orchestrates the operation of the other elements 520-580. The network interface 520 provides a communication interface through which programmer defect reports may be submitted, access to programmer defect reports may be obtained, and other communication with programmer computing devices may be performed. Similarly, network interface 520 provides a communication interface through which end users may submit end user error reports, support personnel may open, modify and close end user error reports, and other communications between end users and support personnel may be performed.

End user error report database interface 530 provides a communication interface through which access to end user error reports may be obtained. Programmer defect report database interface 540 provides a communication interface through which access to programmer defect reports may be obtained. Through these interfaces, new programmer defect reports and end user error reports may be stored in the databases as well as accessed in order to perform the operations of the present invention, as previously described.

End user error report parser 550 retrieves end user error reports from the end user error report database, via interface 530, and parses these end user error reports to populate a general end user error report template. As previously mentioned, this parsing may involve identifying tags within the end user error report and extracting information associated with these tags for insertion into fields of the general template to thereby generate an end user error report template. Similarly, the programmer defect report parser 560 parses the programmer defect reports in the programmer defect report database to generate one or more programmer defect report templates that are to be compared to the end user error report template.

The comparison engine 570 performs the comparison of the end user error report template to the one or more programmer defect report templates. This comparison, as described previously, may involve comparing the contents of fields of the templates that correspond to determine if the contents match. The correspondence between fields may be determined, for example, based on the tags associated with the fields and predetermined rules implemented by the comparison engine 570. The comparison engine 570 compares the templates and, based on weights associated with fields of the end user error report template, calculates a degree of matching of the end user error report template to the various programmer defect report templates. Those programmer defect report templates that have a degree of matching that is at least a predetermined threshold are determined to match the end user error report template. The information regarding which programmer defect report templates match the end user error report template is then provided to the end user error report update engine 580.

The end user error report update engine 580 updates the end user error report with information from the matching programmer defect reports to generate a modified end user error report. The modified end user error report may then be stored in the end user error report database and may also be provided to the support personnel computing device that opened the end user error report.

Figure 6:
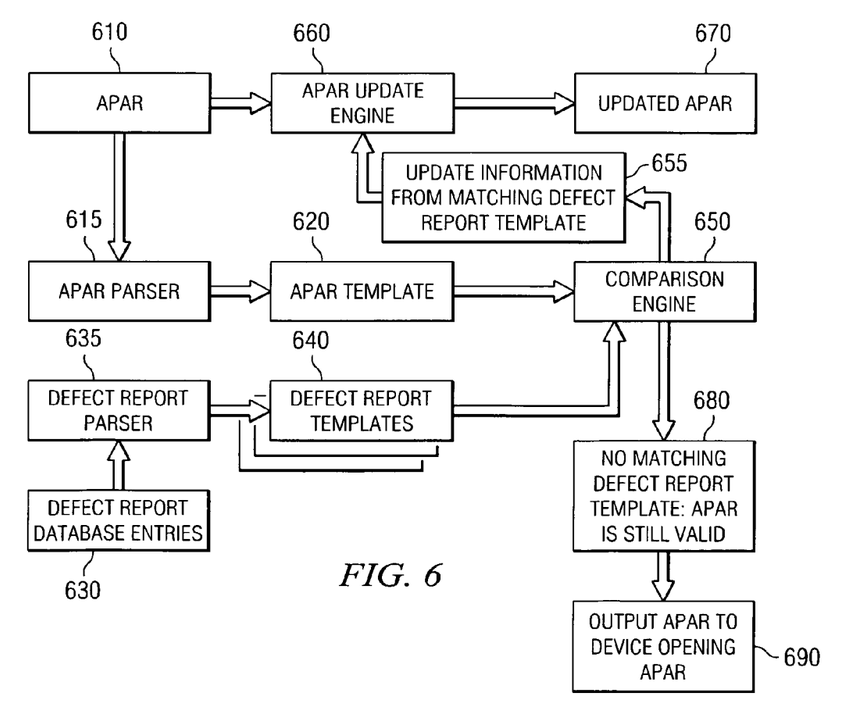
FIG. 6 is an exemplary block diagram illustrating a process of correlating programmer defect reports with an opened APAR in accordance with one exemplary embodiment of the present invention.

FIG. 6 is an exemplary block diagram illustrating a process of correlating programmer defect reports with an opened end user error report, also known as an Authorized Program Analysis Report (APAR), in accordance with one exemplary embodiment of the present invention. As shown in FIG. 6, an APAR 610 is opened, e.g., from an end user error report, or APAR, database by support personnel in order to handle the error report. The APAR is provided to APAR parser 615, e.g., end user error report parser, which generates an APAR template 620. Similarly, defect report entries 630 are retrieved from the programmer defect report database and parsed by the defect report parser 635 to generate defect report templates 640.

The APAR template 620 and the defect report templates 640 are provided to the comparison engine 650 which compares the templates 620 and 640 to determine if there are any defect report templates 640 that match the APAR template 620 to a sufficient degree. If not, then the APAR is still a valid end user error report 680 and the APAR is sent to the support personnel computing device 690 as is without modification.

If there is at least one defect report template 640 that matches the APAR template 620 to a sufficient degree, then the APAR 610 is updated with information from the matching defect report template 655. This may involve submitting the identity of the matching defect report template to the APAR update engine 660 which also obtains the original APAR 610. The APAR update engine 660 then extracts information from the defect report corresponding to the matching defect report template 640 and integrates the information into the APAR 610 to generate an updated APAR 670. The updated APAR 670 is then sent to the support personnel computing device that opened the APAR 610. In addition, the updated APAR 670 may be stored in the APAR database for future reference.

Figure 7B:
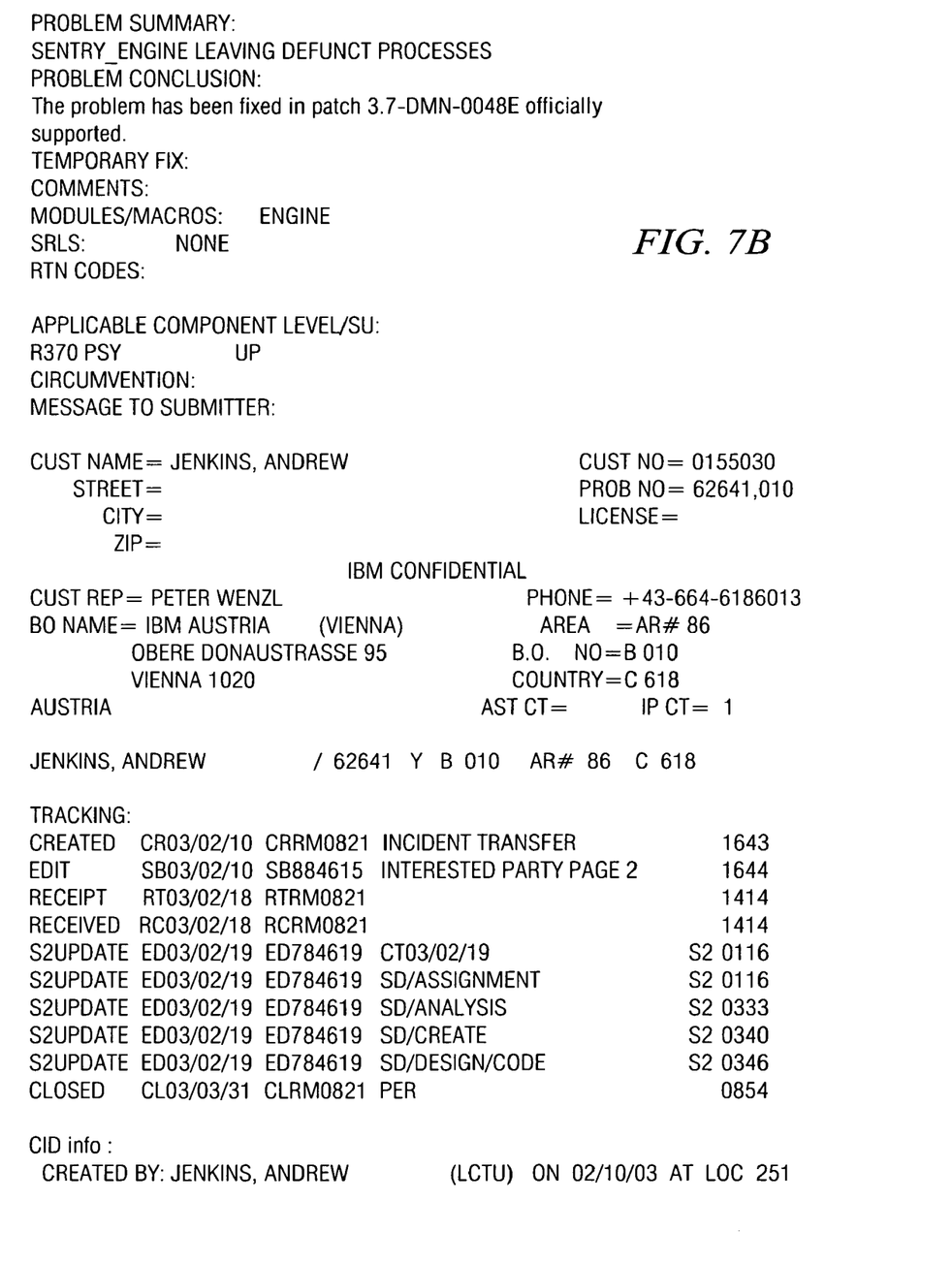
Figure 8A:
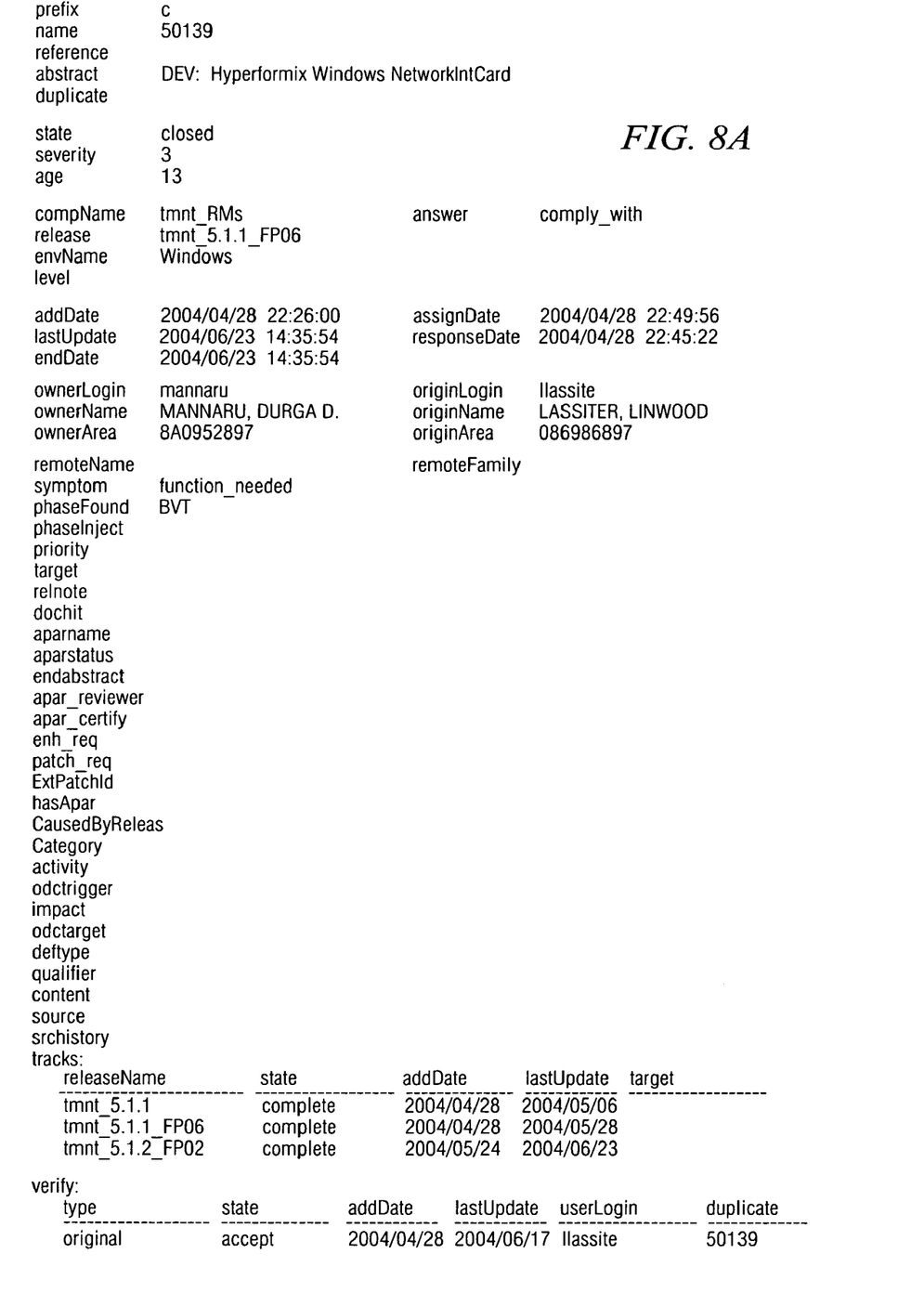

FIGS. 7A and 7B illustrate an example of an APAR which may be used with the present invention. FIGS. 8A and 8B illustrate an example of a programmer defect log entry which may be used with the present invention. Tags may be added to the APAR and programmer defect log to facilitate correlating the two using the present invention. For example, the most common tags which may be added to the programmer defect log and APAR may include tags such as "abstract," "compName," "release," "envName," and the like. These tags may take any form depending on the particular implementation and are inserted into the APAR and programmer defect log at positions corresponding to the portions of the APA and programmer defect log matching the inserted tag. These tags, in one exemplary embodiment, may take a form similar to HyperText Markup Language (HTML) tags such that a beginning tag and an ending tag for each portion of the APAR and programmer defect log are inserted to designate the portions that may be used for correlating APARs with programmer defect logs in accordance with the exemplary embodiments of the present invention.

Figure 9:
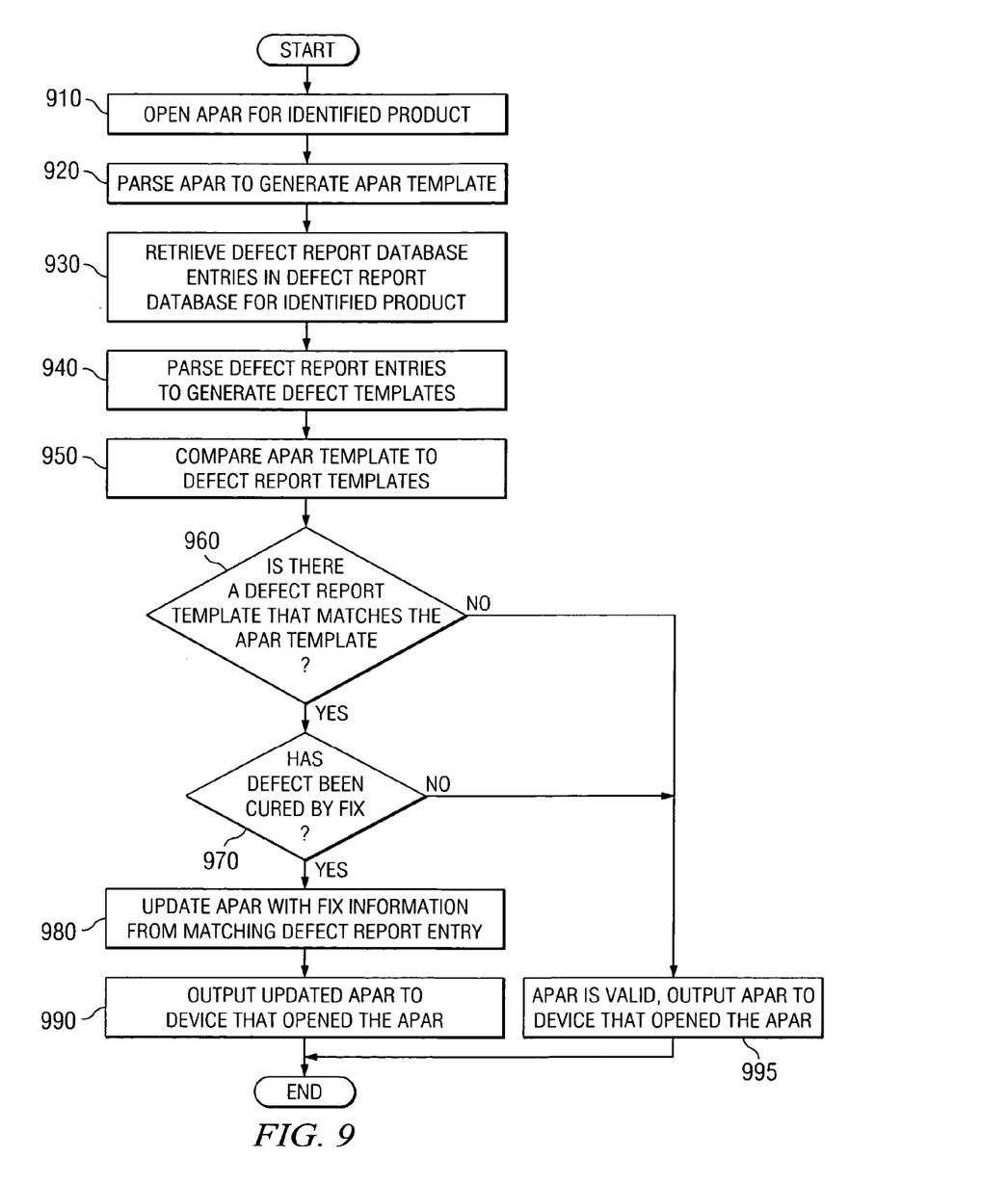
FIG. 9 is a flowchart outlining an exemplary operation of one exemplary embodiment of the present invention when correlating programmer defect log entries with an opened APAR.

FIG. 9 is a flowchart outlining an exemplary operation of one exemplary embodiment of the present invention when correlating programmer defect log entries with an opened APAR. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 9, the operation starts by opening an APAR for an identified software product (step 910). The APAR is parsed to generate an APAR template (step 920). Defect entries in the defect database for the identified software product are retrieved (step 930) and parsed to generate one or more defect templates (step 940).

Thereafter, the APAR template is compared to the one or more defect templates (step 950). A determination is made as to whether there is a defect template that matches the APAR template (step 960). If not, the APAR is considered to still be valid and the original APAR is output to the computing device that opened the APAR (step 995).

If there is a matching defect template, a determination is made as to whether the defect has been cured by a fix identified in the matching defect template (step 970). Step 970 is optional and is provided as a mechanism for permitting updating of APARs only when a fix or patch has been developed for a particular defect that matches the APAR. This determination may be made by looking at the tags in the matching defect report to determine if there is any informational content associated with a tag representing a fix or patch. If so, then a fix or patch has been devised. Otherwise, a fix or patch is not available for the problem associated with the APAR. Alternatively, as described previously, this check may be omitted and the APAR may be updated with information from the matching defect report regardless of whether a fix or patch has been devised or not.

If a fix or patch has been devised for the problem associated with the APAR, or if step 970 is omitted, the APAR is updated with the fix or patch information from the matching defect report (step 980). In addition, other information from the defect report may also be integrated into the APAR. Thereafter, the updated APAR is output to the computing device that opened the APAR (step 990). If a fix or patch has not been generated for the problem associated with the APAR, then the original APAR is output unmodified (step 995). The operation then terminates.

Thus, the present invention provides a mechanism for automatically updating end user error reports, or APARs, with information from matching programmer defect reports. The present invention provides a mechanism for matching programmer defect reports to end user error reports so that information from matching programmer defect reports may be extracted and integrated into the end user error reports before providing the end user error reports to support personnel. In this way, the support personnel are provided with the most current and accurate information about the state of the problem associated with the end user error report prior to the support personnel expending time and resources on handling the end user error report.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for handling end user error reports for a software product, comprising:

opening the end user error report;

responsive to the opening of the end user error report, extracting information from the end user error report to generate an end user error report template containing the information extracted from the end user error report;

extracting information from one or more defect reports to generate one or more defect report templates containing the information extracted from the one or more defect reports, wherein the defect reports each comprise an identification of (i) at least one defect in the software product and (ii) a fix for each respective defect that is identified in the defect report, wherein the fix that is identified is computer code that is operable to correct its respective defect when executed;

comparing the end user error report template to the one or more defect report templates;

determining if a defect report template in the one or more defect report templates matches the end user error report template; and updating the end user error report based on a defect report corresponding to a matching defect report template if the defect report template in the one or more defect report templates matches the end user error report template, wherein updating the end user error report based on a defect report includes updating the end user error report to include an identifier of a fix or patch that solves a problem that is a basis for the user error report, the identifier being obtained from the defect report.

2. The method of claim 1, wherein updating the end user error report based on a defect report includes updating the end user error report to also include an identifier of a source of a problem that is a basis for the user error report, the identifier being obtained from the defect report, wherein the end user error report is used by support personnel at a support system in handling reported end user errors generated at an end user system.

3. The method of claim 1, wherein the end user error report that is opened includes information that was automatically accumulated by a computing device prior to the computing device encountering an error for the software product.

4. The method of claim 1, further comprising:
receiving, by a support system, the end user error report from an end user system;
presenting the updated end user error report via a support personnel workstation at the support system, wherein the end user error report is used by support personnel at the support system in handling reported end user errors generated at the end user system.

5. The method of claim 1, wherein extracting information from the end user error report to generate an end user error report template includes:
parsing the end user error report to identify information associated with first tags within the end user error report corresponding to fields in an end user error report template format; and
populating the fields in the end user error report template with information associated with corresponding first tags.

6. The method of claim 5, wherein extracting information from one or more defect reports to generate one or more defect report templates includes:
parsing the one or more defect reports to identify information associated with second tags within the one or more defect reports corresponding to fields in a defect report template format; and
populating fields in one or more defect report templates with information associated with corresponding second tags in the one or more defect reports.

7. The method of claim 1, wherein comparing the end user error report template to the one or more defect report templates includes comparing contents of one or more corresponding fields in the end user error report template and the one or more defect report templates and determining if the contents match.

8. The method of claim 7, wherein comparing the end user error report template to the one or more defect report templates includes determining a total degree of matching of the one or more corresponding fields based on results of the comparison of contents of the one or more corresponding fields in the end user error report template and the one or more defect report templates.

9. The method of claim 1, further comprising storing the updated end user error report in an end user error report database.

10. A computer recordable-type medium encoded with a computer program product that is operable with a data processing system for handling end user error reports for a software product, comprising:
instructions for opening the end user error report;
instructions for extracting, responsive to the instructions for opening of the end user error report, information from the end user error report to generate an end user error report template containing the information extracted from the end user error report;
instructions for extracting information from one or more defect reports to generate one or more defect report templates containing the information extracted from the one or more defect reports, wherein the defect reports each comprise an identification of (i) at least one defect in the software product and (ii) a fix for each respective defect that is identified in the defect report, wherein the fix that is identified is computer code that is operable to correct its respective defect when executed;
instructions for comparing the end user error report template to the one or more defect report templates;
instructions for determining if a defect report template in the one or more defect report templates matches the end user error report template; and
instructions for updating the end user error report based on a defect report corresponding to a matching defect report template if the defect report template in the one or more defect report templates matches the end user error report template, wherein the instructions for updating the end user error report based on a defect report include instructions for updating the end user error report to include an identifier of a fix or patch that solves a problem that is a basis for the user error report, the identifier being obtained from the defect report.

11. The computer program product of claim 10, wherein the instructions for updating the end user error report based on a defect report include instructions for updating the end user error report to also include an identifier of a source of a problem that is a basis for the user error report, the identifier being obtained from the defect report, wherein the end user error report is used by support personnel at a support system in handling reported end user errors generated at an end user system.

12. The computer program product of claim 10, wherein the end user error report that is opened includes information that was automatically accumulated by a computing device prior to the computing device encountering an error for the software product.

13. The computer program product of claim 10, further comprising:
instructions for receiving, by a support system, the end user error report from an end user system;
instructions for presenting the updated end user error report via a support personnel workstation at the support system, wherein the end user error report is used by support personnel at the support system in handling reported end user errors generated at the end user system.

14. The computer program product of claim 10, wherein the instructions for extracting information from the end user error report to generate an end user error report template include:
instructions for parsing the end user error report to identify information associated with first tags within the end user error report corresponding to fields in an end user error report template format; and
instructions for populating the fields in the end user error report template with information associated with corresponding first tags.

15. The computer program product of claim 14, wherein the instructions for extracting information from one or more defect reports to generate one or more defect report templates include:
 instructions for parsing the one or more defect reports to identify information associated with second tags within the one or more defect reports corresponding to fields in a defect report template format; and
 instructions for populating fields in one or more defect report templates with information associated with corresponding second tags in the one or more defect reports.

16. The computer program product of claim 10, wherein the instructions for comparing the end user error report template to the one or more defect report templates include instructions for comparing contents of one or more corresponding fields in the end user error report template and the one or more defect report templates and determining if the contents match.

17. The computer program product of claim 16, wherein the instructions for comparing the end user error report template to the one or more defect report templates include instructions for determining a total degree of matching of the one or more corresponding fields based on results of the comparison of contents of the one or more corresponding fields in the end user error report template and the one or more defect report templates.

18. The computer program product of claim 10, further comprising instructions for storing the updated end user error report in an end user error report database.

19. A system for handling end user error reports for a software product, comprising:
 a processor;
 an end user error report database coupled to the processor; and
 a defect report database coupled to the processor, wherein the processor opens an end user error report in the end user error report database, extracts information from the end user error report in response to opening of the end user error report in order to generate an end user error report template containing the information extracted from the end user error report, extracts information from one or more defect reports in the defect report database to generate one or more defect report templates containing the information extracted from the one or more defect reports, compares the end user error report template to the one or more defect report templates, determines if a defect report template in the one or more defect report templates matches the end user error report template, and updates the end user error report based on a defect report corresponding to a matching defect report template if the defect report template in the one or more defect report templates matches the end user error report template, wherein the defect reports each comprise an identification of (i) at least one defect in the software product and (ii) a fix for each respective defect that is identified in the defect report, wherein the fix that is identified is computer code that is operable to correct its respective defect when executed, wherein the processor updates the end user error report to include (1) a first identifier of a source of a problem that is a basis for the user error report, the first identifier being obtained from the defect report and (2) a second identifier of a fix or patch that solves a problem that is a basis for the user error report, the second identifier being obtained from the defect report.

20. The system of claim 19, wherein the end user error report that is opened includes information that was automatically accumulated by a computing device prior to the computing device encountering an error for the software product.

\* \* \* \* \*